> United States Patent Office 2,898,784
Patented Aug. 11, 1959

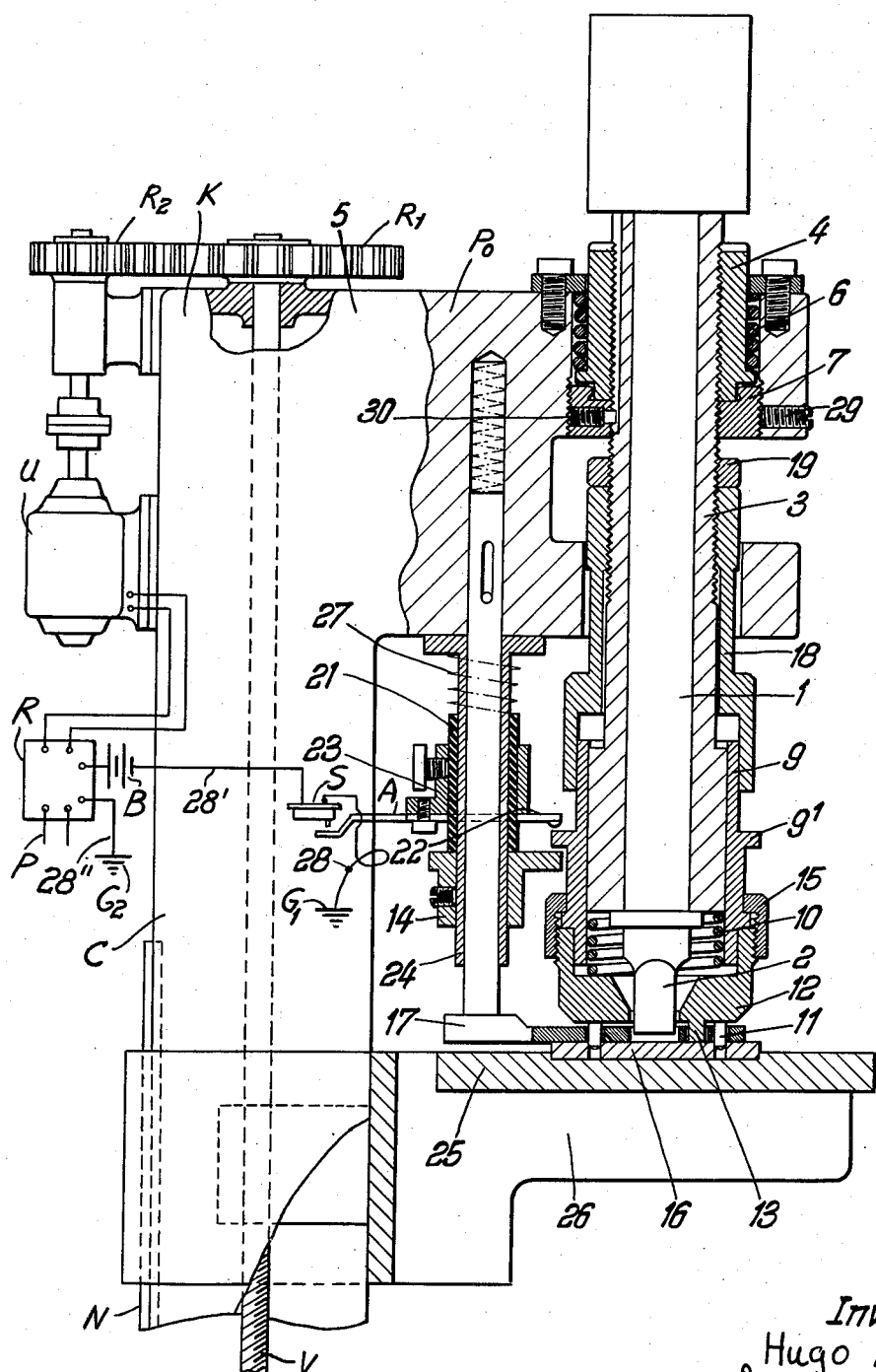

2,898,784
AUTOMATICALLY CONTROLLED MACHINE TOOL

Hugo Allemann, Schaanwald, Liechtenstein, assignor to Hugo Allemann, A.G., Luterbach So. Switzerland
Application February 20, 1957, Serial No. 641,427
Claims priority, application Switzerland February 25, 1956
5 Claims. (Cl. 77—34.5)

The present invention refers to machine tools and more specifically to machine tools automatically controlled for uniformly machining a work piece. More specifically the invention applies to boring machines for automatically controlling the depth of cut performed by the boring tool and for preventing any machining of the work piece if the latter is not properly located in the machine with respect to the normal position of the boring tool.

In the process of end milling and depth boring with boring machines it has been impossible to avoid, even after most careful adjustment of the movement of the machine head or the machine table in vertical direction, that the depth of a desired cut varies between different work pieces if measured with respect to the same reference surface thereof, because the thickness of the pieces may vary or because the supporting surface of the machine table may be contaminated e.g. by small chips whereby the location of the reference surface with respect to the supporting surface, or the location of work piece surface with respect to the supporting surface, or finally the distance between the tool in a reference position and the reference surface in the work piece may vary. Consequently, often a number of work pieces had to be rejected after having been machined.

Therefore it is a main object of the invention to provide a control device by means of which a precise depth of cut can be obtained disregarding existing variations of conditions as stated above so that in connection with the use of certain guide means for the work pieces and with an electrical safety device rejects among the work pieces can be practically eliminated.

It is another object of the invention to provide a depth control device for boring machines which is comparatively simple and is reliable in operation as well as sturdy enough to have a long life.

With the above objects in view, a preferred embodiment of this invention consists mainly in a device limiting the vertical feed by means of feeler means independently of the total feed movement of the machine, the controlling factor being the desired depth of cut in reference to the face of the work piece located opposite the cutting tool. For this purpose, a feeler device movable in axial direction of the tool spindle is provided which carries guide or locating means for the workpiece and is adapted to abut against the work piece and which engages the guide means of the spindle as soon as the desired depth of cut is reached and then stops the feed movement of the tool. If a workpiece is relatively mislocated with respect to the tool spindle within permissible limits, a faultless boring job can be achieved because the tool spindle can align itself on account of being mounted floating and resiliently movable in an axial direction in the machine head; however, if the mislocation of the work piece with respect to the guide means is beyond permissible limits, then the forward feed of the machine is stopped by an electrical safety device.

In a preferred embodiment of the present invention, a machine tool including at least one movable machine element being a tool carrier adapted to move towards a work piece relatively thereto and floatingly mounted in said machine tool for automatic alignment with the work piece, comprises a depth control means for preventing the tool carrier from movement when the tool carrier has moved a predetermined distance in a direction towards the work piece, and a safety device including feeler means adapted to sense an incorrect position of the work piece in the machine tool relative to the tool carrier, and means for preventing start of a machining operation if the feeler means sense an incorrect position of the work piece, whereby it is made possible to machine a plurality of work pieces consecutively and uniformly to a predetermined depth of cut, simultaneously assuring that the machining operation is started only if a work piece is in correct position with respect to the tool carrier.

In another aspect of the present invention an automatically controlled machine tool having a work piece holder means and tool holder means, at least one of these holder means being movable toward and away from the other holder means, comprises means for limiting the extent of operation during a single machining operation, said limiting means being operatively connected to and movable with a movable one of said holder means so as to limit movement thereof during a single machining operation. The machine tool further comprises feeler means interposed between said limiting means and the work piece carried by the work holder means for determining the initial position of the limiting means at the start of the machining operation relative to a surface portion of the work piece, whereby the extent of operation of the tool holder means is made dependent upon the position of said surface portion of the work piece with respect to the limiting means before the start of the machining operation.

In still another aspect of the present invention a machine tool including tool spindle means axially movable relative to a work piece supported in the machine tool comprises adjustable control means mounted on the machine tool for stopping the tool spindle means in its movement towards the workpiece, and actuating means for said control means resiliently attached to the tool spindle means opposite said control means and movable between an inoperative position in which the actuating means are spaced from the control means and an operative position in which the actuating means engage the control means for actuating the same. The actuating means include sensing means adapted to engage the workpiece before the tool spindle means reach a position in which machining of the workpiece starts, said sensing means causing the actuating means to move relatively to the tool spindle means from their inoperative position into their operative position in which the control means are actuated if said sensing means sense an improper position of the workpiece with respect to the tool spindle means, whereby a movement of the tool spindle means is stopped before a machining operation is started if the workpiece is in improper position relative to the tool spindle means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which an embodiment of the invention is illustrated in a cross sectional view showing the guide means for the tool spindle and diagrammatically part of the machine frame and of the machine head.

The upright machine frame K has an overhanging top portion $P_o$ which mounts the tool spindle 1 with the tool 2. Vertical feed movement of the support plate 25 of the machine table or work table 26 upon the vertical column C of the frame is effected by feed mechanism or means of any suitable or conventional form here indicated by a vertical back screw spindle V driven as through gears $R_1$ and $R_2$ from a motor unit U which may be of the gear reducer type. A vertical guide key arrangement N secured the work support table against rotation in a horizontal plane.

The tool spindle 1 carrying the tool 2 is rotatably supported in a spindle guide sleeve 3 which is floatingly mounted in the machine head 5 by means of an adjustment nut 4 so as to be turnable and resiliently supported in the frame. The spring 6 urges the nut 4 against the adjustment collar 7 and thereby maintains the spindle 1 constantly in a set position as long as the tool pressure is normal, but causes the spindle always to return to that position after the pressure has temporarily increased. Besides, the spring 6 has the task to press the nut 4 and thereby the spindle 1 axially towards the work piece.

The stop sleeve 9 is secured against turning by means not shown and is guided for axial movement along the spindle guide sleeve 3 while being held against the work piece 16 by a compression spring 10, as will be explained below. In idle or starting position the stop sleeve 9 rests with its flange 9' against the setting member 14 which limits the downward movement of the stop sleeve 9. The guide piece 12 has a projection 13 and guide pins 11. A coupling nut 15 connects the guide piece 12 with the stop sleeve 9 to support the spring 10. Between the guide piece 12 and the work piece 16 is located an L-shaped spring-supported support 17 which is provided with openings permitting the passage of the tool 2, the projection 13 and the guide pins 11 and which resiliently engages the work piece 16 during the feed movement so as to hold this piece in place and to strip it from the tool 2 after the machining operation is completed. An axial movement of the stop sleeve 9 is limited in the opposite direction by a threaded adjustment bushing 18 which is mounted on a portion of the spindle guide sleeve 3 intermediate its ends in a manner that permits axial adjustment to various positions in which it can be locked by means of a locknut 19.

For facilitating the setting-up of the machine, the spindle guide sleeve 3 is mounted adjustably about its axis by means of the collar 7, independently of the adjustment of the machine as a whole. After a set screw 29 has been loosened the collar 7 can be turned together with the guide sleeve 3 with which it is slidingly connected by a coupling screw 30 engaging an axial groove, until the pins 11 of the stopping sleeve 9 register with the corresponding locating holes in the work piece.

In order to further avoid rejects caused by work pieces when their relation to the guide means is outside the limits reconciliable with obtaining an exact depth of cut as well as correct location of the cut, the stop sleeve 9 is also adapted to cooperate with an electrical safety device by means of its flange 9'. For example, a finger 22 is mounted adjustably with respect to the flange 9' on a carrier member 23 which is supported and guided by a sleeve 24 attached to the machine head 5 and connected to an insulating sleeve 21 sliding on the sleeve 24 so as to be axially movable along the latter because it is urged by a spring 27 against the setting member 14 clamped to the sleeve 24. From the finger 22 an electrical impulse may be imparted to switch means or the like which control the feed means of the machine head or table and are adapted to stop the latter upon an impulse derived from the operation of contact 22. For example, an extension arm A may cooperate with a micro-switch S to close an actuating circuit, comprising conductors 28, 28', 28" and supplied by a suitable power source such as battery B and grounded at $G_1$ and $G_2$ will operate a relay R to cut off the power supply P to the drive motor M when the feed of the work table reaches the predetermined limit at which the drilling operation is to be stopped due to flange 9' contacting finger 22.

In operation, the device functions as follows: after the work piece 16 has been placed manually or mechanically into a suitable recess of the support plate 25 of the machine table 26, either the head 5 of the machine frame is moved downwards or the machine table 26 is moved with the work piece 16 upwards. If the work piece was placed correctly in the support plate 25, then the guide pins 11 of the guide piece 12 will enter, after a short travel, the corresponding locating holes of the work piece 16 until the projection 13 of the guide piece 12 touches the upper surface of the work piece 16. Now the cutting operation can be started. In this stage the machine head 5 and the table 26 are moved towards each other whereby the spring 10 is compressed. When the tool 2 has cut to the required depth, the upper end face of the stop sleeve 9 is met by the inside shoulder of the adjustment bushing 18 so that the downward feed of the tool 2 relative to the work piece 16 is positively stopped. It can be seen that since the stop sleeve 9 is interposed as a rigid element between the top surface of the work piece (which in this case is the reference surface for determining the desired depth of cut) and the inside shoulder of the adjustment sleeve 18 firmly attached to the guide sleeve 3 of the spindle 1 which, in turn, positively engages the spindle 1, the depth of cut in reference to the top surface of the work piece can be predetermined precisely by setting the adjustment sleeve 18 on the guide sleeve 3 so that in normal position of the machine elements in question the distance between the said inner shoulder of sleeve 18 and the upper end face of sleeve 9 represents the desired depth.

For the purpose of preventing the work piece 16 from being machined in a mislocated position, the electrical safety device shown in the drawing operates as follows: When setting up the machine the contact 22 is set by means of the carrier member 23 along the insulating sleeve 21 so that a small gap remains between the contact 22 and the upper surface of the flange 9' of the stop sleeve 9. Now, if for instance the surface of the nest provided in the support plate 25 for the work piece is contaminated by chips, or if the work piece is mislocated or wrongly oriented inside the nest so that the guide pins 11 cannot enter or can only partly enter the corresponding locating holes in the work piece, then, even before the cutting edge of the tool 2 can touch the top surface of the work piece 16, the stop sleeve 9 will be held back against the action of spring 10 and therefore move upward relative to the downward moving guide sleeve 3 and also with respect to the sleeve 24 connected to the head 5 that carries the guide sleeve 3, and therefore the contact 22 will be engaged by the upper surface of the flange 9' and close a circuit to an impulse giving device whereby the further feed movement of the machine head 5 and the tool 2 relative to the machine table 26 carrying the work piece 16 is immediately stopped. In this manner improper machining of the work piece is safely prevented.

If, however, a possible mislocation of the work piece 16 in the support plate 25 is still within tolerable limits and therefore not calling for stopping the operation altogether, then the condition is automatically corrected as follows: In such a case the guide pins 11 are so little out of alignment with the locating holes in the work piece, that the guide sleeve 3 with the tool spindle 1 will automatically align itself under the influence of the guide pins 11 tending to enter the locating holes of the work piece 16, because the guide sleeve is floatingly and resiliently held in the machine head 5 by the sleeve 4 and the spring 6.

It will be understood that each of the elements described above, or two or more together, may also find a useful application in other types of control devices for machine tools of different type from the types described above.

While the invention has been illustrated and described as embodied in depth control device for boring machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, tool spindle means axially movable relative to a work piece supported in said machine tool; feed means for moving said spindle means and work piece towards each other; adjustable control means mounted on said machine tool for stopping said tool spindle means in its movement towards said work piece; and actuating means for said control means resiliently attached to said tool spindle means opposite said control means and movable between an inoperative position in which said actuating means are spaced from said control means and an operative position in which said actuating means engage said control means for actuating the same, said actuating means including sensing means adapted to engage said work piece before said tool spindle means reach a position in which machining of said work piece starts, said sensing means causing said actuating means to move relatively to said tool spindle means from said inoperative position into said operative position in which said control means are actuated if said sensing means sense an improper position of said work piece with respect to said tool spindle means whereby a movement of said tool spindle means is stopped before a machining operation is started, if said work piece is in improper position relative to said tool spindle means.

2. In a machine tool, in combination, tool spindle means axially movable relative to a work piece supported in said machine tool; feed means for moving said spindle means and work piece towards each other; adjustable control means mounted on said machine tool for stopping said tool spindle means in its movement towards said work piece, said control means including electrical circuit means comprising electrical contact means and switch means for interrupting the action of said feed means; and actuating means for said electrical contact means resiliently attached to said tool spindle opposite said electrical contact means and movable between an inoperative position in which said actuating means are spaced from said electrical contact means and an operative position in which said actuating means engage said electrical contact means for actuating the same, said actuating means including sensing means adapted to engage said work piece before said tool spindle means reach a position in which machining of said work piece starts, said sensing means causing said actuating means to move relatively to said tool spindle means from said inoperative position into said operative position in which said electrical contact means are actuated if said sensing means sense an improper position of said work piece with respect to said tool spindle means whereby a movement of said tool spindle means is stopped before a machining operation is started, if said work piece is in improper position relative to said tool spindle means.

3. In a machine tool, in combination, tool spindle means axially movable relative to a work piece supported in said machine tool; feed means for moving said spindle means and work piece towards each other; adjustable control means mounted on said machine tool for stopping said tool spindle means in its movement towards said work piece, said control means including electrical circuit means comprising electrical contact means and switch means for interrupting the action of said feed means; and actuating means for said electrical contact means resiliently attached to said tool spindle means opposite said electrical contact means and movable along said tool spindle means between an inoperative position in which said actuating means are spaced from said electrical contact means and an operative position in which said actuating means engage said electrical contact means for actuating the same, said actuting means including sensing means adapted to engage said work piece before said tool spindle means reach a position in which machining of said work piece starts, said sensing means causing said actuating means to move relatively to said tool spindle means from said inoperative position into said operative position in which said electrical contact means are actuated if said sensing means sense an improper position of said work piece with respect to said tool spindle means whereby a movement of said tool spindle means is stopped before a machining operation is started, if said work piece is in improper position relative to said tool spindle means.

4. In a machine tool, in combination, tool spindle means axially movable relative to a work piece supported in said machine tool; feed means for moving said spindle means and work piece towards each other; adjustable control means mounted on said machine tool for stopping said tool spindle means in its movement towards said work piece; and actuating means for said control means resiliently attached to said tool spindle means opposite said control means and movable between an inoperative position in which said actuating means are spaced from said control means and an operative position in which said actuating means engage said control means for actuating the same, said actuating means including sensing means adapted to engage a preselected surface portion of said work piece before said tool spindle means reach a position in which machining of said work piece starts, said sensing means causing said actuating means to move relatively to said tool spindle means from said inoperative position into said operative position in which said control means are actuated if said sensing means sense an improper position of said work piece with respect to said tool spindle means whereby a movement of said tool spindle means is stopped before a machining operation is started, if said work piece is in improper position relative to said tool spindle means.

5. In a machine tool, in combination, tool spindle means axially movable relative to a work piece means supported in said machine tool; control means on said machine tool for stopping said means in its movement; and actuating means for said control means and movable between an inoperative position in which said actuating means do not actuate said control means and an operative position in which said actuating means actuate said control means, said actuating means including sensing means adapted to engage said work piece before said tool spindle means reach a position in which machining of said work piece means starts, said sensing means causing said actuating means to move from said inoperative position into said operative position in which said control means are actuated if said sensing means sense an improper position of said work piece means with respect to said tool spindle means, whereby a movement of said tool spindle means is stopped before a machining operation is started, if said work piece means is in improper position relative to said tool spindle means.

References Cited in the file of this patent

UNITED STATES PATENTS

| | | |
|---|---|---|
| 2,070,463 | Allemann | Feb. 9, 1937 |
| 2,207,340 | Claus | July 9, 1940 |
| 2,421,541 | Claus et al. | June 3, 1947 |
| 2,461,716 | Blatt | Feb. 15, 1949 |
| 2,674,906 | Timpner | Apr. 13, 1954 |